United States Patent
Chen et al.

(10) Patent No.: US 7,224,085 B2
(45) Date of Patent: *May 29, 2007

(54) SINGLE INDUCTOR DUAL OUTPUT BUCK CONVERTER

(75) Inventors: Jun Chen, Allen, TX (US); Valerian Mayega, Dallas, TX (US); David W. Evans, Allen, TX (US); James L. Krug, Carrollton, TX (US)

(73) Assignee: Texas Instruments Incorporated, Dallas, TX (US)

( * ) Notice: Subject to any disclaimer, the term of this patent is extended or adjusted under 35 U.S.C. 154(b) by 451 days.

This patent is subject to a terminal disclaimer.

(21) Appl. No.: 10/714,103

(22) Filed: Nov. 14, 2003

(65) Prior Publication Data

US 2005/0105227 A1    May 19, 2005

(51) Int. Cl.
*H02J 1/00* (2006.01)
(52) U.S. Cl. ....................................... 307/82
(58) Field of Classification Search ................ 307/82
See application file for complete search history.

(56) References Cited

U.S. PATENT DOCUMENTS

| | | | |
|---|---|---|---|
| 5,715,153 A * | 2/1998 | Lu | ............... 363/65 |
| 6,075,295 A | 6/2000 | Li | |
| 6,215,288 B1 | 4/2001 | Ramsey et al. | |
| 6,222,352 B1 * | 4/2001 | Lenk | ............. 323/267 |
| 6,522,110 B1 | 2/2003 | Ivanov | |
| 2003/0030326 A1 * | 2/2003 | Shenai et al. | ............ 307/21 |

OTHER PUBLICATIONS

"High-Efficiency Multiple-Output DC—DC Conversion for Low-Voltage Systems", Abram P. Dancy, Rajeevan Amirtharajah and Anantha P. Chandrakasan, IEEE Transactions on Very Large Scale Integration (VLSI) Systems. vol. 8. No. 3. Jun. 2000. pp. 252-263.
"Single-Inductor Multiple-Output Switching Converters With Time-Multiplexing Control in Discontinuous Conduction Mode", Dongsheng MA, Wing-Hung Ki, Chi-Ying Tsui and Philip K.T. Mok. IEEE Journal of Solid State Circuits. vol. 38. No. 1. Jan. 2003. pp. 89-100.
"23.1 A Synchronous Dual—Output Switching dc—dc Converter Using Multibit Noise-Shaped Switch Control", Marcus W. May, Michael R. May and John E. Willis, ISSCC 2001/Session 23/ Analog Techniques, IEEE International Solid-State Circuits Conference. Feb. 7, 2001. 2 pgs.

* cited by examiner

Primary Examiner—Robert L. Deberadinis
(74) Attorney, Agent, or Firm—Steven A. Shaw; W. James Brady; Frederick J. Telecky, Jr.

(57) ABSTRACT

A single-inductor dual-output buck converter facilitates power conversion by converting a single DC power source/ supply into two separate DC outputs, each of which can be configured to provide a selected/desired voltage. The converter includes a single inductor and three power switches, which control operation of the converter. The converter has four basic stages of operation in which power is initially supplied to a first output that also stores charge. Subsequently, the stored charge of the first output is employed to provide power to a second output.

24 Claims, 9 Drawing Sheets

DUAL-OUTPUT DUAL-INDUCTOR BUCK CONVERTER

DUAL-OUTPUT SINGLE-INDUCTOR BUCK CONVERTER

DUAL-OUTPUT SINGLE-INDUCTOR BUCK CONVERTER

SINGLE INDUCTOR DUAL OUTPUT BUCK CONVERTER

FIELD OF THE INVENTION

The present invention relates generally to power conversion, and more particularly, to systems and methods for a single inductor dual output buck converter that employs a relatively reduced number of switches.

BACKGROUND OF THE INVENTION

Switching power supply circuits are utilized in a number of different circuit applications. There are three basic switching power supply topologies in common use; buck converter, boost converter, and buck boost converter. These topologies are generally non-isolated, that is, the input and output voltages share a common ground. There are, however, isolated derivations of these non-isolated topologies. The differing topologies refer to how the switches, output inductor and output capacitor associated therewith are interconnected. Each topology has unique properties that include the steady-state voltage conversion ratios, the nature of the input and output currents, and the character of the output voltage ripple. Another property is the frequency response of the duty cycle-to-output voltage transfer function.

A single output buck converter topology is also referred to as a buck converter, buck power stage or a step-down power stage (because the output is always less than the input). The input current for a buck power stage is said to be discontinuous or pulsating if a switching current pulses from zero or some negative value to some positive output current value every switching cycle. The output current for a buck power stage is said to be continuous or nonpulsating because the output current is supplied by an output inductor/capacitor combination. In the latter event, the inductor current never reaches a zero or negative value.

An exemplary basic buck converter circuit is illustrated in prior art FIG. 1A, and designated at reference numeral 10. When a power switch 12 is activated, the switch behaves like a closed circuit, as illustrated in prior art FIG. 1B, and the input voltage VIN is applied to an inductor 14, and power is delivered to an output load 16. The output load voltage is VOUT=VIN−VL, wherein the VL, the voltage across the inductor 14, is given by L(di/dt). The output voltage VOUT also is formed across a capacitor 18, thus the capacitor charges and the output voltage increases each time the switch 12 is closed.

When the switch 12 is deactivated, or turned off, the switch 12 behaves as an open circuit, as illustrated in prior art FIG. 1C, and the voltage across the inductor 14 reverses due to inductive flyback, thus making a circuit diode 20 forward biased. The circuit loop generated by the diode 20 allows the energy stored in the inductor 14 to be delivered to the output load 16, wherein the output current is smoothed by the capacitor 18. Typical waveforms for a buck converter are shown in FIG. 2. The power switch 12 is switched at a relatively high frequency (e.g., between about 20 KHz and about 300 KHz for most converters) to produce a chopped output voltage, however, the inductor 14 and capacitor 18 together operate as an LC filter to produce a relatively smooth output voltage having a DC component with a small ripple voltage overlying the DC value (see, e.g., output voltage waveform of FIG. 2). The ripple voltage can be controlled by varying the duty cycle of the power switch control voltage.

Single output buck converters work well in applications and/or devices that employ a single input voltage. However, some applications and/or devices utilize two power sources. For example, a digital signal processor (DSP) generally employs two power supplies; one power supply (1.8V) is to power an I/O ring and the other (1.2V) is to power a digital core. Dual voltage outputs of the power converter are also reported to reduce power dissipation. Two single output buck converters can be employed in such instances, but at a relatively high cost in terms of power utilization, area utilization, and component costs. Typically, inductors are the highest cost component and employing two buck converters results in requiring two inductors. Additionally, more switches are then employed, which can result in greater power consumption.

What is needed is power supply system that supplies two output voltages, yet is relatively low cost compared with using multiple single output buck converters.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention facilitates power conversion by providing dual outputs (DC) from a single-inductor topology. Generally, a power supply or battery is used as a power source for a first output voltage. Then, the generated first output voltage is used as a power source for a second output voltage.

The present invention provides a single-inductor dual-output buck converter. The dual-output converter employs only three power switches, which saves silicon area, package pins, and power dissipation. Power dissipation is mitigated because there is only one power switch turned on during each operation stage in contrast to conventional dual output converters that have multiple switches on during some operation stages. Additionally, cross regulation can be improved because the buck converter of the present invention operates in discontinuous conduction mode (DCM) for both output voltages.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The present invention will now be described with respect to the accompanying drawings in which like numbered elements represent like parts. The figures provided herewith and the accompanying description of the figures are merely provided for illustrative purposes. One of ordinary skill in the art should realize, based on the instant description, other implementations and methods for fabricating the devices and structures illustrated in the figures and in the following description.

The present invention facilitates power conversion by converting a single DC power source/supply into two separate DC outputs, each of which can be configured to provide a selected/desired voltage level output by selecting component values and controlling system operation. In addition, the generated first output voltage is used as a power source for a second output voltage.

The present invention provides a single-inductor dual-output buck converter that employs only three power switches. As a result, silicon area, package pins, power dissipation, and the like are reduced. Power dissipation is mitigated because there is only one power switch turned on during each operation stage in contrast to conventional dual output converters that have multiple switches on during some operation stages. Additionally, cross regulation can be improved with the buck converter of the present invention because it is operable in discontinuous conduction mode (DCM) for both output voltages, as will be further appreciated below.

DC-DC switching-mode buck converters are widely used in many portable electronics equipment such as cellular phones, MP3 players, digital audio players, digital cameras, and bluetooth devices, to power digital signal processors (DSP) and other digital circuits, due to their high power efficiency. A buck converter steps down the battery voltage (e.g., between 2.7V to 5.5V), and regulates its output voltage (for example, 1.2V, 1.8V) against the variations of the battery and the load current.

Two voltage outputs from a power converter can be required in portable electronic equipment/devices. For instance, a DSP generally employs two power supplies; one power supply (1.8V) is to power an I/O ring and the other (1.2V) is to power a digital core. Dual voltage outputs of the power converter are also reported to reduce power dissipation.

Figure 1A:
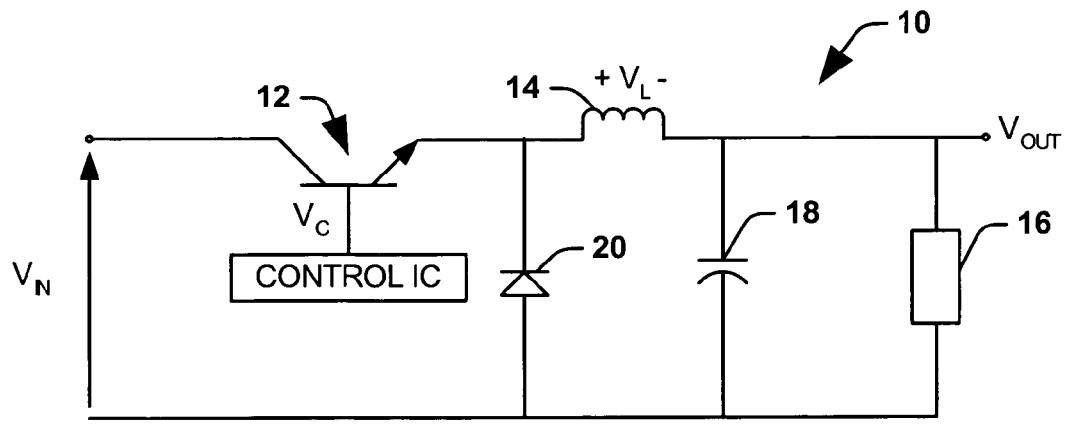
FIG. 1A is a schematic diagram illustrating an exemplary basic buck converter of FIG. 1A.
Figure 1B:
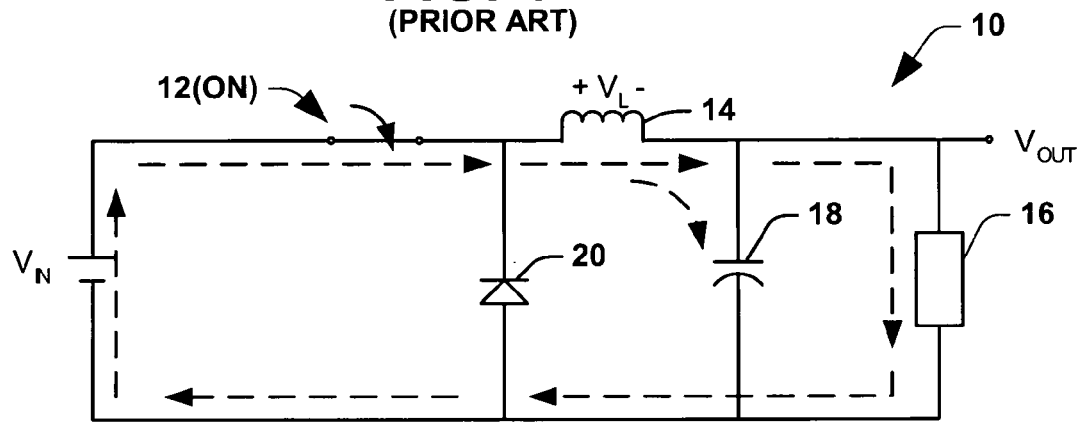
FIG. 1B is a schematic diagram illustrating operation of the exemplary buck converter of FIG. 1A.
Figure 1C:
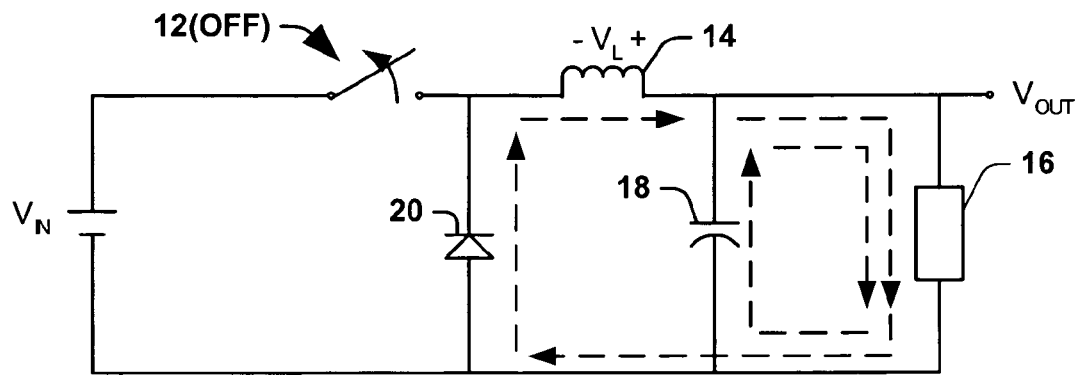
FIG. 1C is a schematic diagram further illustrating operation of the exemplary buck converter of FIG. 1A.
Figure 2:
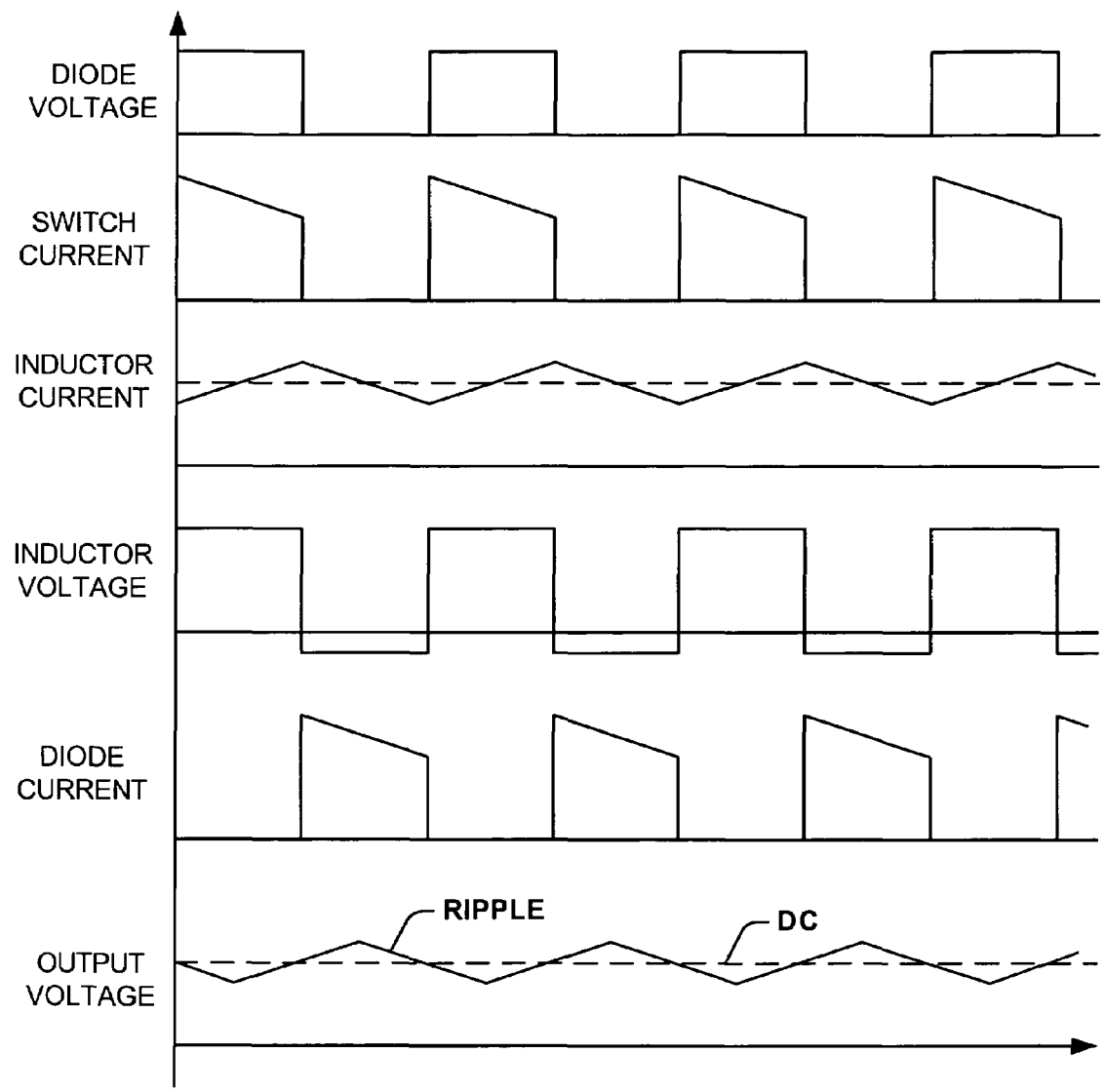
FIG. 2 is a graph illustrating typical waveforms for an exemplary buck converter.
Figure 3:
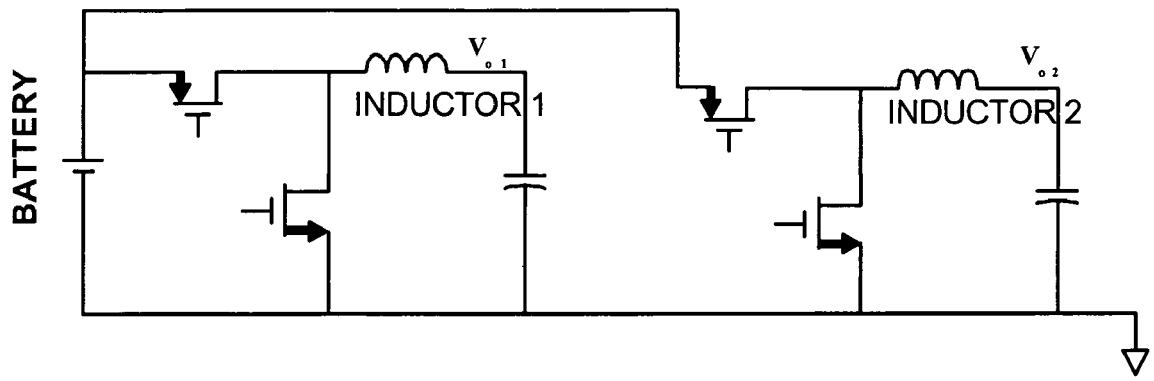
FIG. 3 is a schematic diagram illustrating a conventional dual voltage output buck converter.

Traditionally, dual voltage outputs can be implemented with two separate dc-dc buck converters as shown in FIG. 3. However, the inventors of the present invention note that the implementation in FIG. 3 requires two inductors, which are costly in price and area, and, as a result, the implementation in FIG. 3 is not cost-efficient.

Figure 4:
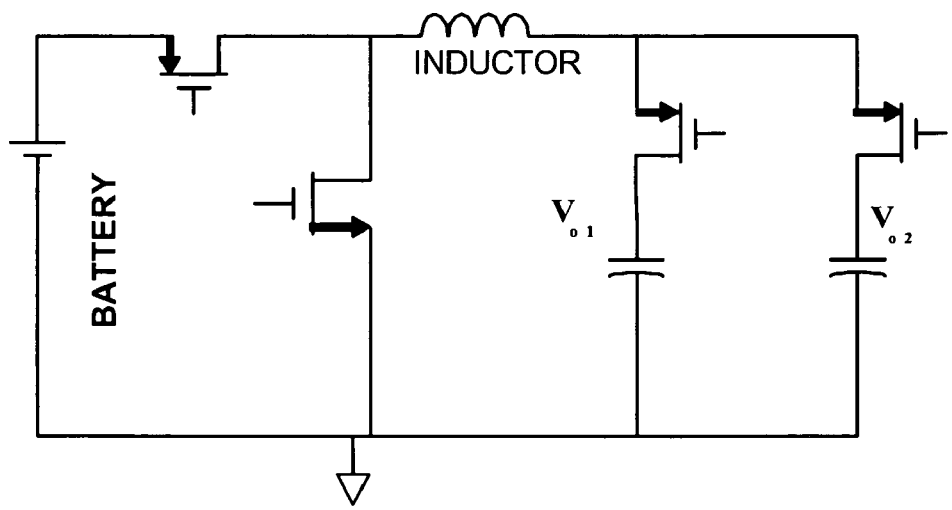
FIG. 4 is a schematic diagram illustrating a conventional single-inductor dual-output buck converter.
Figure 5:
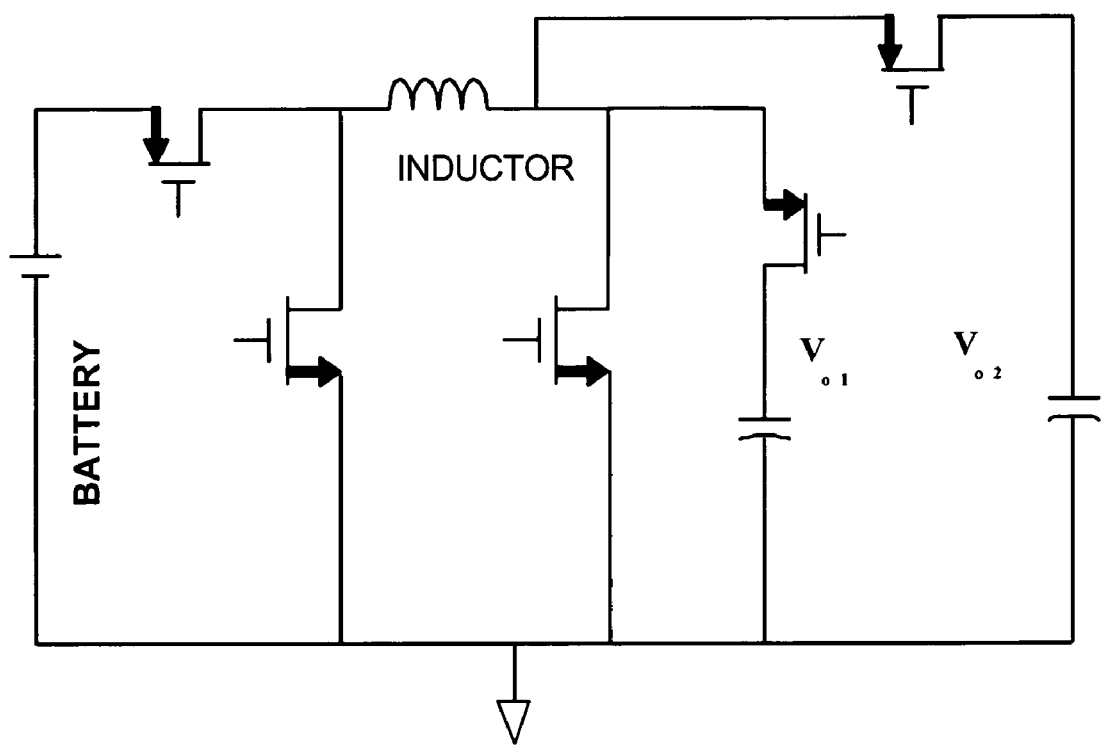
FIG. 5 is a schematic diagram illustrating another conventional single-inductor dual-output buck converter.

Another approach to providing dual output voltages is to use a single inductor dual output voltage converter. FIG. 4 is a schematic diagram illustrating one such prior art single inductor dual output converter. This converter consists of one inductor, four power switches, and two output filter capacitors. However, the inventors of the present invention note that in every operation stage, there are two power switches in series, and thus, the efficiency of this buck converter is diminished. It is also noted that this buck converter employs four switches, which consumes more silicon area. Another prior art single inductor dual-output converter implementation is shown in FIG. 5. This implementation can provide negative voltages, positive voltages, or positive and negative voltages. However, the inventors of the present invention note this implementation, similar to that of FIG. 4, does not have a good efficiency because there are two power switches in series during each operation stage. For dual output voltages, this implementation in FIG. 5 requires even more switches than that of the converter of FIG. 4.

Figure 6:
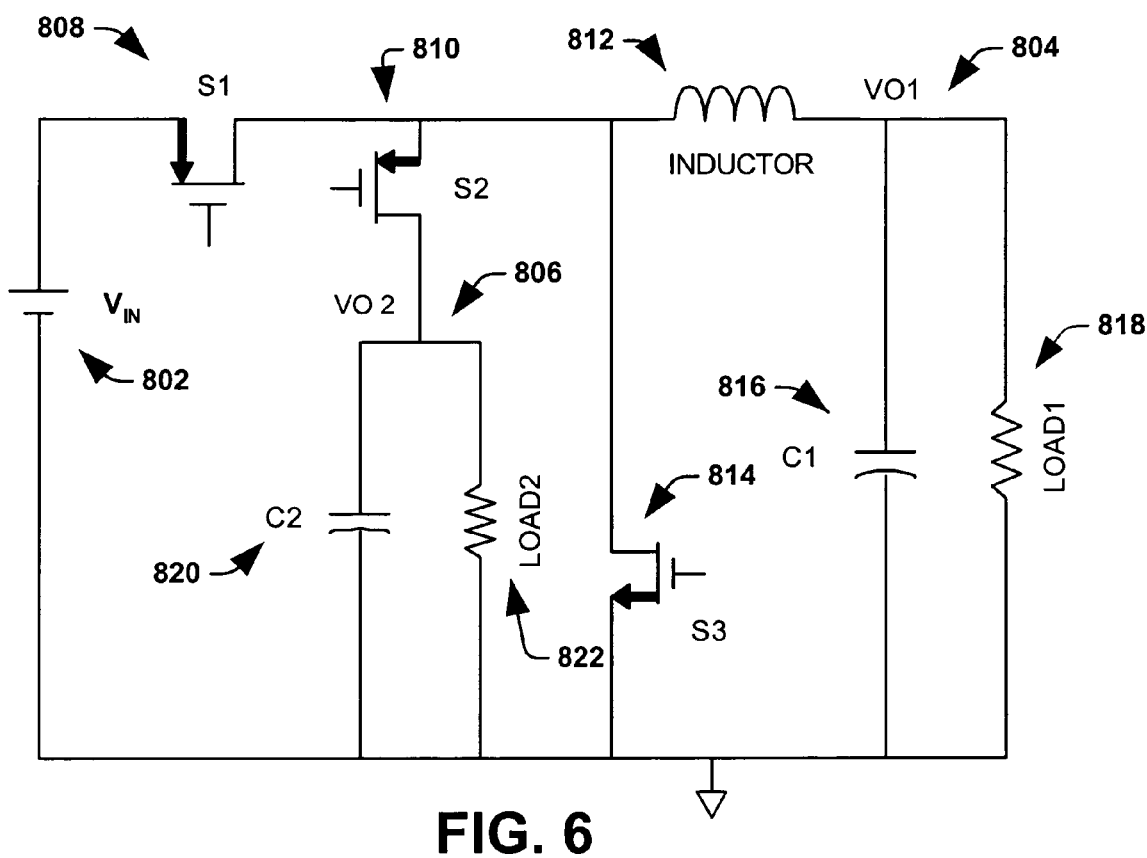
FIG. 6 is a schematic diagram illustrating a single-inductor dual-output buck converter in accordance with an aspect of the present invention.

Turning now to FIG. 6, a schematic diagram illustrating a single-inductor dual-output buck converter in accordance with an aspect of the present invention is provided. The converter supplies two output voltages via a single inductor by using one of the output voltages as a power source for the other output voltage.

The converter includes a power source 802 and supplies a first output 804 and a second output 806. The first output 804 obtains power from the power source 802 via a first switch 808 (S1). The first output 804 then provides power for the second output 806 via a second switch 810 (S2). When the power supply 802 provides power to the first output 804, inductor current flows into a first load 818 and the first output 804. When the first output 804 supplies power to the second output 806, inductor current flows out of the first output 804.

The power supply 802 connects to the first switch 808 (S1), which then connects to a first terminal of an inductor 812. The first output 804 is connected to a second terminal of the inductor 812 and supplies power to the first load 818 and also across a capacitor 816. The second switch 810 (S2) is connected to the first switch 808 (S1) and the first terminal of the inductor 812 and supplies the second output 806 across a second load 822 and a second capacitor 820. A third switch 814 (S3) is connected to the first terminal of the inductor 812.

The value of the components of the converter can vary and still be in accordance with the present invention. In one example, a suitable converter employs the first load 818 at 75 ohms, the second load at 24 ohms, the power source 802 at 3 volts, a frequency of 200 kHz, the inductor 812 being at 3 µH, the first capacitor 816 at 47 µF, and the second capacitor 820 at 10 µF.

In the steady state condition, the operation of the single-inductor dual-output buck converter of FIG. 6 includes four stages, which are described below in FIGS. 7, 8, 9, and 10. Dotted lines in these figures indicate that the switch is in an OFF state.

A controller (not shown) can be employed to generate and supply signals to the first switch 808 (S1), the second switch 810 (S2), and the third switch 814 (S3) to control their operation. The first switch 808 (S1) and the second switch 810 (S2) are turned OFF by applying a high value and ON by applying a low value and the third switch 814 is turned OFF by applying a low value and ON by applying a high value. However, it is appreciated that the present invention includes suitable variations of control signals and control operations.

Figure 7:
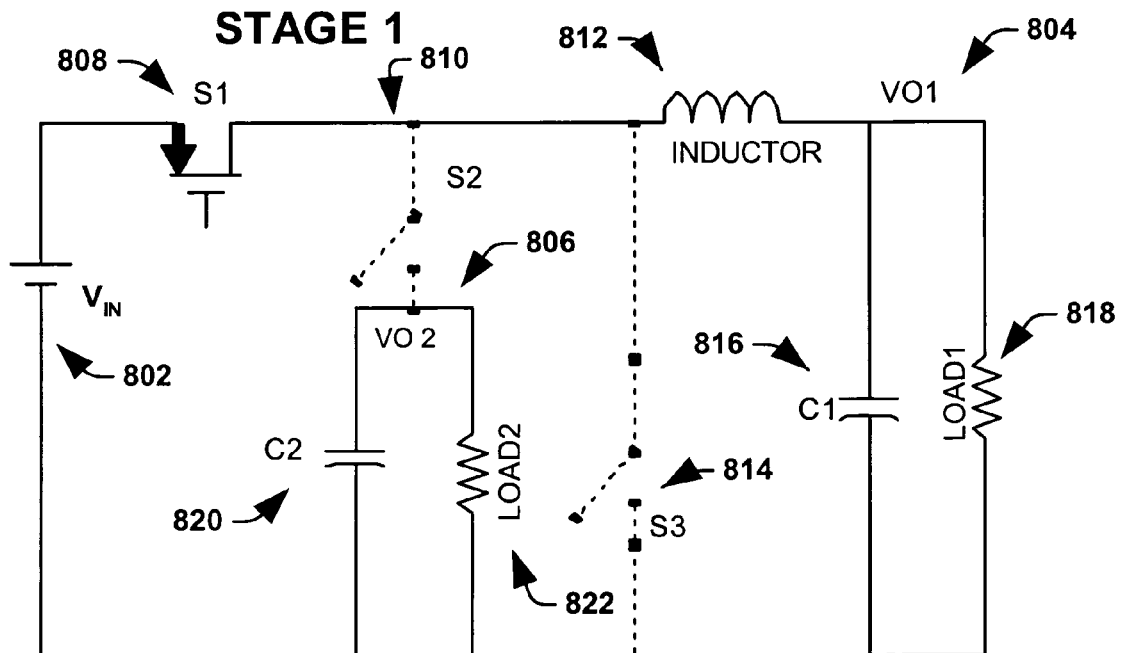
FIG. 7 is a schematic diagram illustrating a first stage of operation for the single-inductor dual-output buck converter of FIG. 6 in accordance with an aspect of the present invention.

FIG. 7 is a schematic diagram illustrating a first stage of operation for the buck converter in accordance with an aspect of the present invention. In the first stage, the first switch 808 (S1) is ON and the second and third switches are OFF. As a result, the power supply 802 charges the first output voltage 804 through the inductor 812. Initially, the direction of the inductor current is negative in that the inductor current flows from the first output voltage 804 back into the power supply 802. Then, the inductor current alters direction and flows into the first output 804, due to the power supply voltage being higher than the first output voltage. Both inductor current and the first output voltage increase in this stage. The first stage is stopped by a switching clock with a fixed frequency. The first switch 808 (S1) is turned OFF and the third switch 814 (S3) is turned on at the end of this stage causing the converter to move into a second stage.

Figure 8:
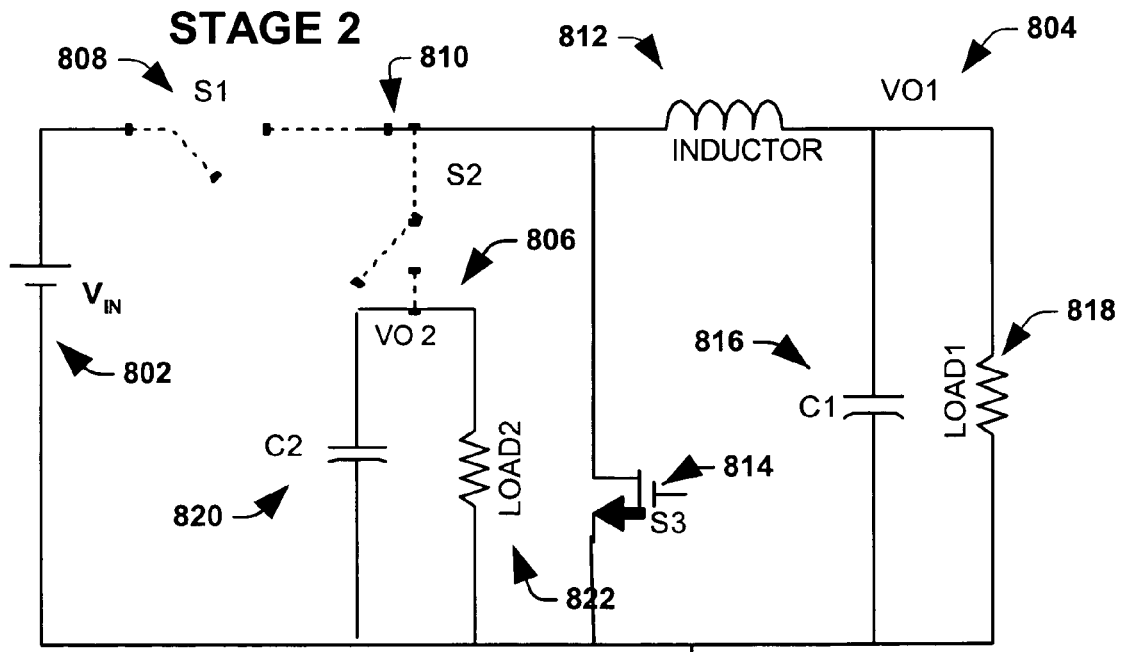
FIG. 8 is a schematic diagram illustrating a second stage of operation for the single-inductor dual-output buck converter of FIG. 6 in accordance with an aspect of the present invention.

FIG. 8 is a schematic diagram illustrating a second stage of operation for the buck converter in accordance with an aspect of the present invention. In the second stage, the third switch 814 (S3) is ON and the first and second switches 808 (S1) and 810 (S2) are OFF. In this stage, the inductor current decreases to about zero. When the inductor current reaches zero, the third switch 814 (S3) is turned off and the buck converter moves to a third stage.

Figure 9:
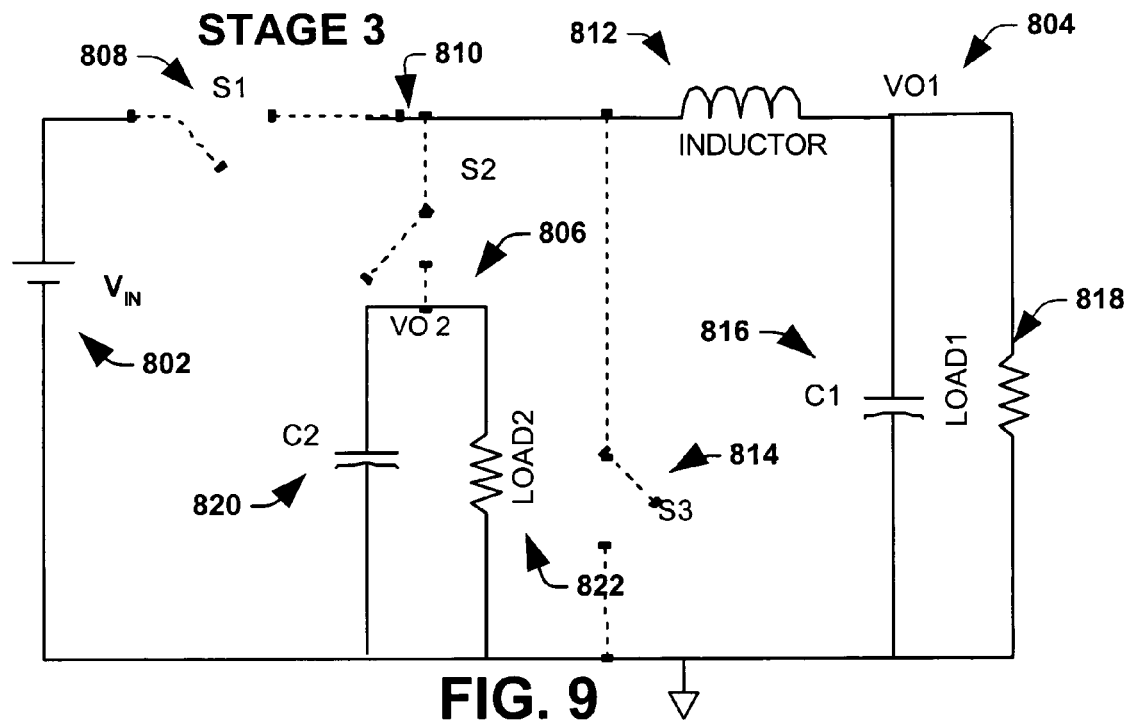
FIG. 9 is a schematic diagram illustrating a third stage of operation for the single-inductor dual-output buck converter of FIG. 6 in accordance with an aspect of the present invention.

FIG. 9 is another schematic diagram illustrating a third stage of operation for the buck converter in accordance with an aspect of the present invention. For this stage, the inductor current stays at about zero until the second output voltage drops below a reference voltage at which time the second switch 810 (S2) is turned ON. The buck converter then moves to a fourth stage.

Figure 10:
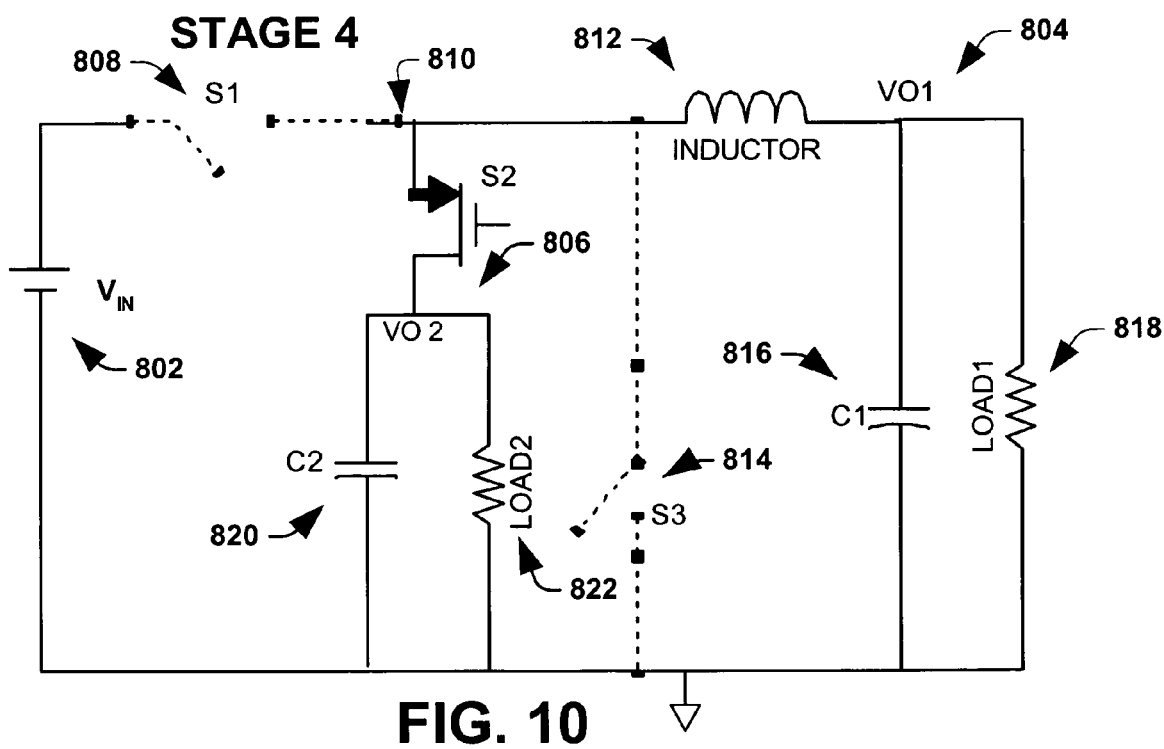
FIG. 10 is a schematic diagram illustrating a fourth stage of operation for the single-inductor dual-output buck converter of FIG. 6 in accordance with an aspect of the present invention.

FIG. 10 is yet another schematic diagram illustrating a fourth stage of operation for the buck converter in accordance with an aspect of the present invention. As shown above, this stage is initiated when the second output voltage drops below the reference voltage in the third stage. In the fourth stage, the inductor current again changes direction and flows out of the first output 804 and the inductor current increases in the reversed direction. The second output 806 gets charged from the first output 804 through the inductor 812 and the second switch 810 (S2). During this stage, the second output voltage increases and the first output voltage decreases. When the first output voltage drops below another reference voltage, the second switch 810 (S2) is turned OFF and the buck converter moves back into the first stage illustrated in FIG. 7.

As is illustrated in FIGS. 8-12, the single-inductor dual-output buck converter of the present invention utilizes only three power switches, which reduces silicon area. Additionally, from the operational stages described above, it can be seen that only one of the three switches is on at any given stage unlike conventional dual output buck converters, thereby decreasing power dissipation and improving converter efficiency.

Figure 11:
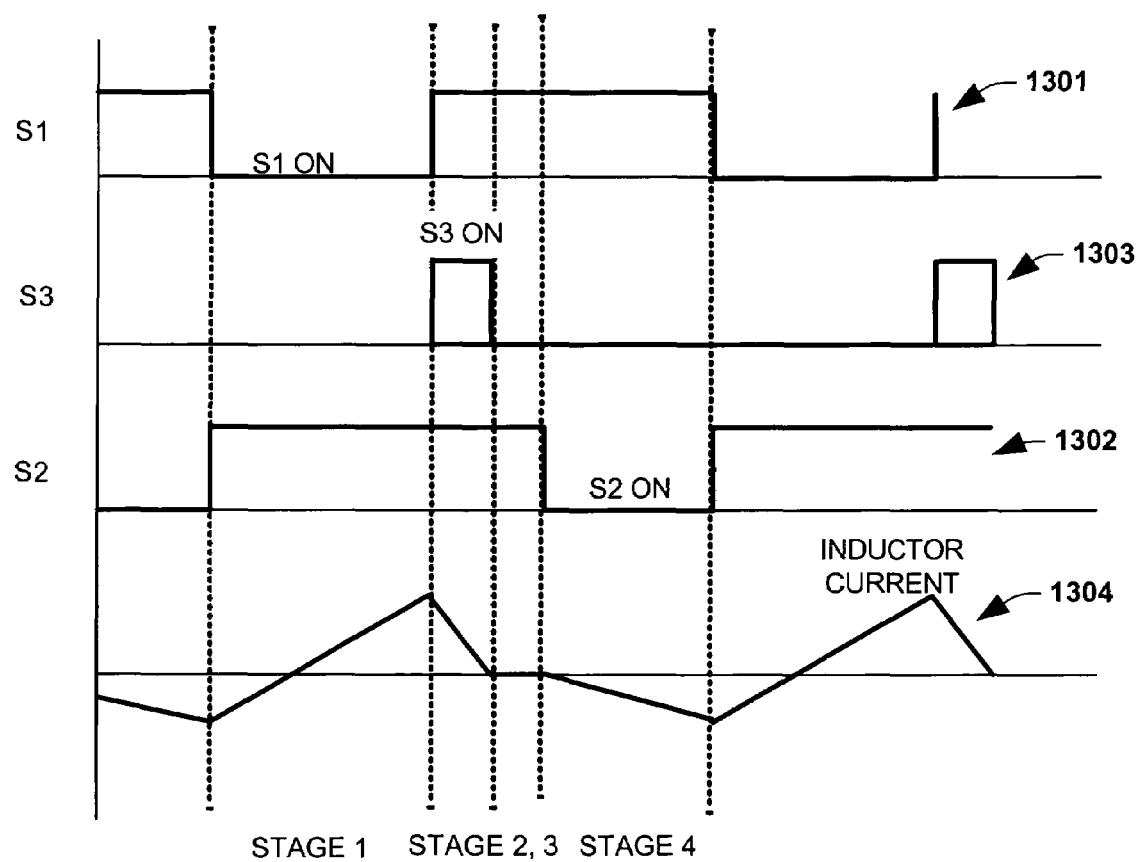
FIG. 11 is a graph illustrating exemplary control signal waveforms and inductor current waveforms for the single-inductor dual-output buck converter of FIG. 6 in accordance with an aspect of the present invention.

Turning now to FIG. 11, a graph illustrating exemplary control signal waveforms and inductor current waveforms for a single-inductor dual-output buck converter of the present invention in accordance with an aspect of the present invention is provided. The waveforms can be applied to the buck converter of FIG. 6 to provide suitable operation of the converter in a buck mode application. Accordingly, FIG. 11 is also described with respect to FIG. 6.

A first control signal 1301 is connected to the first switch 808 (S1) and causes the first switch 808 (S1) to turn ON when the first control signal 1301 is low and to turn OFF when the first control signal 1301 is high. A second control signal 1302 is supplied to the second switch 810 (S2) and causes the second switch 810 (S2) to turn ON when the second control signal 1302 is low and to turn OFF when the second control signal 1302 is high. A third control signal 1303 is supplied to the third switch 814 (S3) and causes the third switch 814 (S3) to turn ON when the third control signal 1303 is high and to turn OFF when the third control signal 1302 is low.

During the first stage of operation, as described with respect to FIG. 7, the first control signal 1301 is low, the second control signal 1302 is high, and the third control signal 1303, is low, causing the first switch 808 (S1), the second switch 810 (S2), and the third switch 814 (S3) to turn ON, OFF, and ON, respectively. As a result, inductor current 1304, which represents inductive current flowing from the power supply 802 to the first output 804, starts negative but becomes positive over time.

During the second stage of operation, as described with respect to FIG. 8, the first control signal 1301 is high, the second control signal 1302 is high, and the third control signal 1303, is high, causing the first switch 808 (S1), the second switch 810 (S2), and the third switch 814 (S3) to turn OFF, OFF, and ON, respectively. During this stage, the inductor current 1304 can be seen dropping from a positive value to about zero at the end of the stage.

During the third stage of operation, as described with regard to FIG. 9, the first control signal 1301 is high, the second control signal 1302 is high, and the third control signal 1303, is low, causing the first switch 808 (S1), the second switch 810 (S2), and the third switch 814 (S3) to turn OFF, OFF, and OFF, respectively. As a result, the inductor current remains at about zero throughout the third stage.

During the fourth stage of operation, as described with regard to FIG. 10, the first control signal 1301 is high, the second control signal 1302 is low, and the third control signal 1303, is low, causing the first switch 808 (S1), the second switch 810 (S2), and the third switch 814 (S3) to turn OFF, ON, and OFF, respectively. Here, the inductor current is initially about zero, but becomes negative because the first output 804 is acting as a power supply or battery for the second output 806. From this stage, the control signals return to their first stage operation and start the four stage cycle again.

From the waveforms shown in FIG. 11, it can be seen that the single-inductor dual-output buck converter of the present invention operates in discontinuous conduction mode (DCM) for both the first and second outputs 804 and 806, and thus the cross regulation performance can be better than that of conventional converters.

Figure 12:
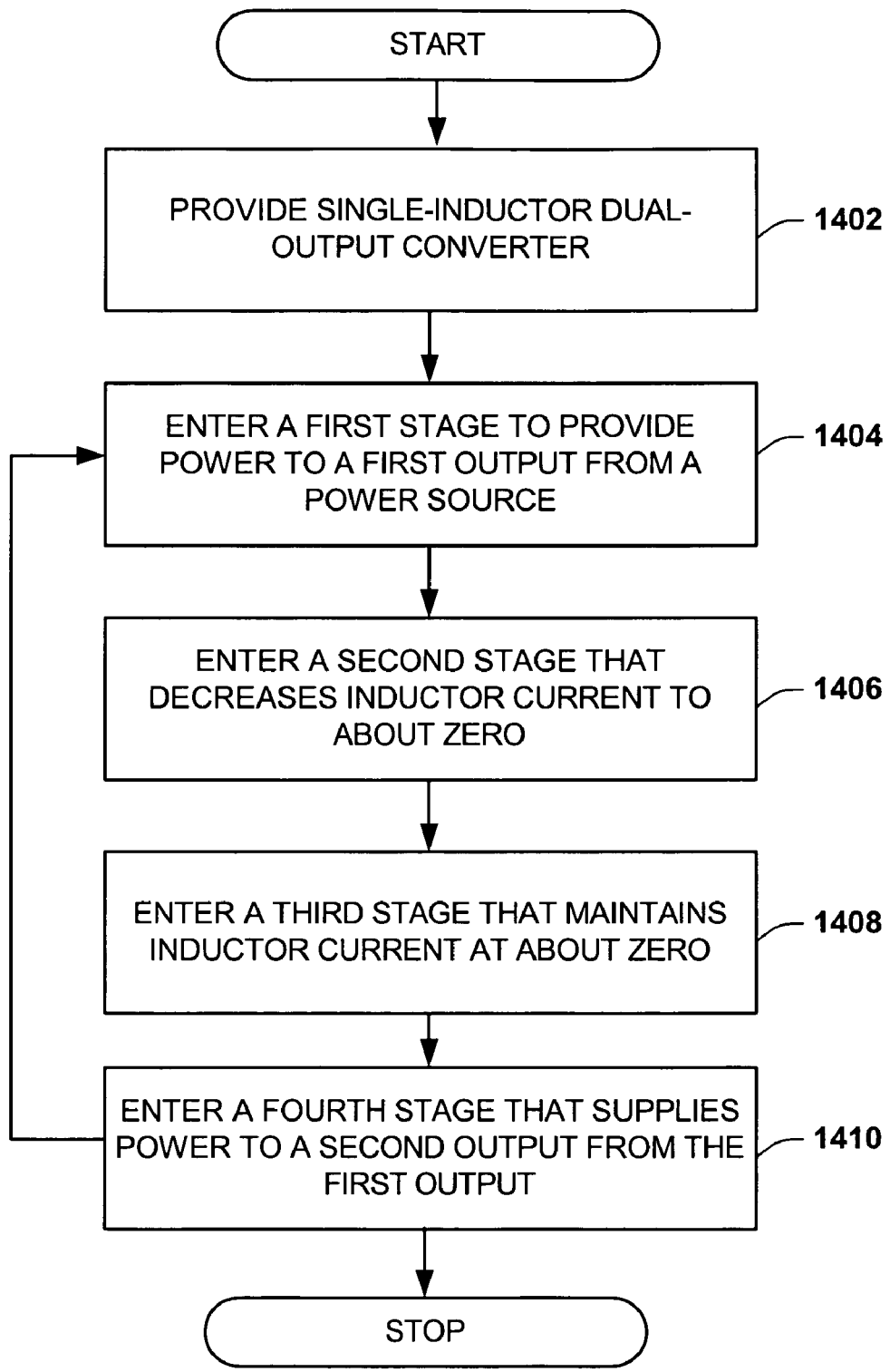
FIG. 12 is a flow diagram illustrating a method of operating a single-inductor dual-output buck converter in accordance with an aspect of the present invention.

In view of the foregoing structural and functional features described supra in FIGS. 8-13, methodologies in accordance with various aspects of the present invention will be better appreciated with reference to the above figures. While, for purposes of simplicity of explanation, the methodology of FIG. 12 is depicted and described as executing serially, it is to be understood and appreciated that the present invention is not limited by the illustrated order, as some aspects could, in accordance with the present invention, occur in different orders and/or concurrently with other aspects from that depicted and described herein. Moreover, not all illustrated features may be required to implement a methodology in accordance with an aspect the present invention.

FIG. 12 is a flow diagram illustrating a method of operating a single-inductor dual-output buck converter in accordance with an aspect of the present invention. The method is able to provide dual output voltages by operating a suitable single-inductor dual-output topology (e.g., see FIG. 6) and controlling operation of the switches therein. Additionally, the present invention includes performing the below stages at a selected frequency to obtain desired output voltages.

The method begins at block 1402 wherein a single-inductor dual-output buck converter of the present invention is provided. The converter comprises three switches, two capacitors, two outputs, one power supply/source, and a single inductor (e.g., FIG. 6). The method enters a first stage of operation at block 1404, wherein inductor current is increased from a negative value to a positive value thereby supplying power to a first output. A capacitor at the first output stores some of the supplied power for later operation. To enter this stage, a first switch is turned ON to connect the power source to the inductor and a second and third switch are turned OFF.

The first stage is exited after a selected period of time and the method enters a second stage of operation at block 1406. In this stage, the inductor current is decreased, steadily, until the inductor current is at about zero. The first switch is turned OFF thereby removing the power source from the inductor. Additionally, the third switch is turned ON to connect the inductor to ground and the second switch remains OFF.

Subsequently, the method enters a third stage of operation at block 1408, wherein the inductor current is held at about zero until a second output voltage of a second output drops below a second reference voltage. Here, the third switch is turned OFF, which results in all of the switches being OFF. Continuing on, the method enters a fourth stage of operation at block 1410 in which the first output supplies power to a second output. The inductor current is decreased from about zero to a negative value thereby supplying current and power to the second output. The second switch is turned ON in this stage to allow the inductor current to be supplied from the inductor and the first output. Like the first output, the second output also has a capacitor that stores charge. The method then returns to the first stage at block 1404 upon the first output voltage dropping below the reference value to continue conversion operation of the converter or stops.

Although the invention has been shown and described with respect to a certain aspect or various aspects, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several aspects of the invention, such feature may be combined with one or more other features of the other aspects as may be desired and advantageous for any given or particular application. Furthermore, to the extent that the term "includes" is used in either the detailed description or the claims, such term is intended to be inclusive in a manner similar to the term "comprising."

What is claimed is:

1. A single-inductor dual-output buck converter comprising:
   a power source;
   a first output that selectively obtains power from the power source through a single inductor; and
   a second output that selectively obtains power from the first output through the single inductor.

2. The converter of claim 1, further comprising a first switch that controllably provides power from the power source to the first output.

3. The converter of claim 2, further comprising a second switch that controllably provides the power from the first output to the second output.

4. The converter of claim 1, wherein the first output further comprises a first capacitor and a first load, wherein the first capacitor stores a charge and is in parallel to the first load.

5. The converter of claim 4, wherein the second output further comprises a second capacitor and a second load, wherein the second capacitor stores a charge and is in parallel to the second load further.

6. The converter of claim 1, further comprising a third switch connected to the single inductor that selectively causes inductor current to decrease to zero.

7. The converter of claim 1, wherein the power supply produces a voltage of about 3 V, the first output produces a voltage of about 1.8 V, and the second output produces a voltage of about 1.2 V.

8. The converter of claim 7, wherein the first output and the second output supply a total current of about 150 mA.

9. A single-inductor dual-output buck converter comprising:
   a power source having a positive terminal and a negative terminal, wherein the negative terminal is connected to ground;
   a first switch having a first terminal and a second terminal, wherein the first terminal is connected to the positive terminal of the power source;
   a second switch having a first terminal and a second terminal, wherein the first terminal is connected to the second terminal of the first switch;
   a third switch having a first terminal and a second terminal, wherein the first terminal is connected to the first terminal of the second switch and wherein the second terminal is connected to ground;

a single inductor having a first terminal and a second terminal, wherein the first terminal is connected to the first terminal of the second switch;

a first output connected to ground and the second terminal of the single inductor; and a second output connected to ground and the second terminal of the second switch.

10. The converter of claim 9, wherein the first output comprises a first load and a first capacitor, the first load having a positive terminal connected to the second terminal of the single inductor and a negative terminal connected to ground, the first capacitor having a positive terminal connected to the second terminal of the inductor and a negative terminal connected to ground.

11. The converter of claim 10, wherein the second output comprises a second load and a second capacitor, the second load having a positive terminal connected to the second terminal of the inductor and a negative terminal connected to ground, the second capacitor having a positive terminal connected to the second terminal of the single inductor and a negative terminal connected to ground.

12. The converter of claim 11, wherein the first switch is turned ON and the second switch and the third switch are turned OFF during a first stage of operation that increases the single inductor current and supplies power to the first output, wherein the first switch and the second switch are turned OFF and the third switch is turned ON during a second stage of operation that decreases the inductor current, wherein the first switch, the second switch, and the third switch are turned OFF during a third stage of operation that maintains the single inductor current at about zero and drops a voltage across the second output until the voltage drops below a first reference voltage, wherein the first switch and the third switch are turned OFF and the second switch is turned ON during a fourth stage of operation that changes a direction of the single inductor current and supplies power to the second output from the first output until the voltage of the first output drops below a second reference voltage.

13. The converter of claim 11, wherein the first capacitor has a capacitance of 47 uF, the second capacitor has a capacitance of 10 uF, a switching frequency of the converter is about 200 Khz and a ramp amplitude of 20 mV, a first reference voltage is 500 mV, the first output provides a voltage of about 1.8, the second output provides a voltage of about 1.2, the single inductor has an inductance of about 3 uH, and the power source supplies a voltage of about 3 V.

14. A method of operating a single-inductor dual-output buck converter comprising:

entering a first stage of operation upon a first output voltage of a first output dropping below a first reference voltage, wherein the first stage of operation includes increasing a single inductor current from a negative value to a positive value to supply power to the first output;

entering a second stage of operation from the first stage, wherein the second stage of operation includes decreasing the single inductor current supplied to the first output until the single inductor current is about zero;

entering a third stage of operation from the second stage, wherein the third stage of operation includes maintaining the single inductor current at about zero until a second output voltage of a second output drops below a second reference voltage; and entering a fourth stage of operation from the third stage, wherein the fourth stage of operation includes decreasing the single inductor current to a negative value to supply power to the second output from the first output.

15. The method of claim 14, wherein the first stage of operation further comprises turning a first switch ON that connects a power source to the single inductor, wherein the inductor is connected to the first output.

16. The method of claim 14, wherein the second stage of operation further comprises turning a first switch OFF that connects a power source to the single inductor and turning a third switch ON that connects the single inductor to ground.

17. The method of claim 14, wherein the third stage of operation further comprises turning a third switch OFF that connects the single inductor to ground.

18. The method of claim 14, wherein the fourth stage of operation further comprises turning a first switch OFF to isolate a power source to the single inductor and the first output and turning a second switch ON to connect the second output to the single inductor.

19. The method of claim 14, wherein the first stage of operation further comprises turning a first switch ON that connects a power source to the single inductor, wherein the single inductor is connected to the first output, wherein the second stage of operation further comprises turning the first switch OFF and turning a third switch ON that connects the single inductor to ground, wherein the third stage of operation further comprises turning the third switch OFF, and wherein the fourth stage of operation further comprises turning the first switch OFF to isolate a power source to the single inductor and the first output and turning a second switch ON to connect the second output to the single inductor.

20. The method of claim 19, further comprising generating a first signal to control the first switch that turns the first switch ON during the first stage of operation and OFF during the second, third, and fourth stages of operation, generating a second signal to control the second switch that turns the second switch ON during the fourth stage of operation and OFF during the first, second, and third stages of operation, and generating a third signal to control the third switch that turns the third switch ON during second stage of operation and OFF during the first, third, and fourth stages of operation.

21. The method of claim 14, wherein supplying power to the first output travels through only one switch and supplying power to the second output travels only through one switch.

22. A method of operating a single-inductor dual-output buck converter comprising:

providing power to a first output from a power source through a single inductor; and providing power to a second output from the first output.

23. The method of claim 22, further comprising providing the power to the first output from a power source through the single inductor in a first direction.

24. The method of claim 23, further comprising providing the power to the second output from the first output through the single inductor in a second direction that is opposite the first direction.

* * * * *